(12) United States Patent
Harel et al.

(10) Patent No.: US 9,154,204 B2
(45) Date of Patent: Oct. 6, 2015

(54) IMPLEMENTING TRANSMIT RDN ARCHITECTURES IN UPLINK MIMO SYSTEMS

(71) Applicant: Magnolia Broadband Inc., Warren, NJ (US)

(72) Inventors: Haim Harel, New York, NY (US); Sherwin J. Wang, Towaco, NJ (US); Eduardo Abreu, Allentown, PA (US); Kenneth Kludt, San Jose, CA (US); Phil F. Chen, Denville, NJ (US)

(73) Assignee: Magnolia Broadband Inc., Englewood, NJ (US)

( * ) Notice: Subject to any disclaimer, the term of this patent is extended or adjusted under 35 U.S.C. 154(b) by 96 days.

(21) Appl. No.: 13/775,886

(22) Filed: Feb. 25, 2013

(65) Prior Publication Data

US 2013/0329820 A1 Dec. 12, 2013

Related U.S. Application Data

(60) Provisional application No. 61/658,014, filed on Jun. 11, 2012, provisional application No. 61/658,009,
(Continued)

(51) Int. Cl.
*H04B 7/04* (2006.01)
*H04B 7/08* (2006.01)
*H04B 7/06* (2006.01)

(52) U.S. Cl.
CPC ............ *H04B 7/0456* (2013.01); *H04B 7/0404* (2013.01); *H04B 7/0413* (2013.01);
(Continued)

(58) Field of Classification Search
CPC ...... H04B 7/0413; H04B 7/06; H04B 7/0602; H04B 7/0613; H04B 7/0615; H04B 7/0617; H04B 7/0619; H04B 7/0667; H04B 7/0673; H04B 7/0682; H04B 7/0686; H04B 7/0689; H04B 7/0691; H04B 7/0693; H04B 7/0697; H04B 7/0404; H04B 7/04; H04B 7/0632; H04B 7/063; H04B 7/0608; H04B 7/0456
USPC .............. 455/69, 101, 103, 500, 553.1, 562.1
See application file for complete search history.

(56) References Cited

U.S. PATENT DOCUMENTS 4,044,359 A  8/1977 Applebaum et al.
4,079,318 A  3/1978 Kinoshita
(Continued)

FOREIGN PATENT DOCUMENTS

EP  1 867 177  5/2010
EP  2 234 355  9/2010
(Continued)

OTHER PUBLICATIONS

Office Action issued by the United States Patent and Trademark Office for U.S. Appl. No. 13/630,146 dated Jan. 22, 2013.
(Continued)

*Primary Examiner* — Sophia Vlahos
(74) *Attorney, Agent, or Firm* — Pearl Cohen Zedek Latzer Baratz LLP

(57) ABSTRACT

A system for implementing a transmit uplink channel in MIMO RDN architecture is provided herein. The system includes a multiple-input-multiple-output (MIMO) transmitting system that includes a MIMO baseband module having N branches; and a radio distribution network (RDN) connected to the MIMO receiving system. The RDN includes at least one beamformer, wherein each of the beamformers feeds K transmit antennas, so that a total number of transmit antennas in the system is M=N*K. At least some of the beamformers include passive splitters/combiners configured to split the signal coming from the transmitter into multiple signals which are weighted individually going to each transmit antenna. The baseband module is configured to repeatedly apply a "blind scanning" process to at least some of the transmit antennas, one at a time, so that performance of the tested transmit beam can be graded.

8 Claims, 5 Drawing Sheets

Related U.S. Application Data filed on Jun. 11, 2012, provisional application No. 61/665,592, filed on Jun. 28, 2012, provisional application No. 61/665,597, filed on Jun. 28, 2012, provisional application No. 61/665,638, filed on Jun. 28, 2012.

(52) U.S. Cl.
CPC .............. *H04B 7/0617* (2013.01); *H04B 7/086* (2013.01); *H04B 7/0632* (2013.01); *H04B 7/0695* (2013.01); *H04B 7/088* (2013.01)

(56) References Cited

U.S. PATENT DOCUMENTS

| | | | |
|---|---|---|---|
| 4,359,738 A | 11/1982 | Lewis | |
| 4,540,985 A | 9/1985 | Clancy et al. | |
| 4,628,320 A | 12/1986 | Downie | |
| 5,162,805 A | 11/1992 | Cantrell | |
| 5,363,104 A | 11/1994 | Richmond | |
| 5,444,762 A | 8/1995 | Frey et al. | |
| 5,732,075 A | 3/1998 | Tangemann et al. | |
| 5,915,215 A | 6/1999 | Williams et al. | |
| 5,936,577 A | 8/1999 | Shoki et al. | |
| 5,940,033 A | 8/1999 | Locher et al. | |
| 6,018,317 A | 1/2000 | Dogan et al. | |
| 6,046,655 A | 4/2000 | Cipolla | |
| 6,101,399 A | 8/2000 | Raleigh et al. | |
| 6,163,695 A | 12/2000 | Takemura | |
| 6,167,286 A | 12/2000 | Ward et al. | |
| 6,215,812 B1 | 4/2001 | Young et al. | |
| 6,226,507 B1 | 5/2001 | Ramesh et al. | |
| 6,230,123 B1 | 5/2001 | Mekuria et al. | |
| 6,259,683 B1 | 7/2001 | Sekine et al. | |
| 6,297,772 B1 | 10/2001 | Lewis | |
| 6,321,077 B1 | 11/2001 | Saitoh et al. | |
| 6,335,953 B1 | 1/2002 | Sanderford et al. | |
| 6,370,378 B1 | 4/2002 | Yahagi | |
| 6,377,783 B1 | 4/2002 | Lo et al. | |
| 6,393,282 B1 | 5/2002 | Iimori | |
| 6,584,115 B1 | 6/2003 | Suzuki | |
| 6,647,276 B1 | 11/2003 | Kuwahara et al. | |
| 6,697,622 B1 | 2/2004 | Ishikawa et al. | |
| 6,697,633 B1 | 2/2004 | Dogan et al. | |
| 6,735,182 B1 | 5/2004 | Nishimori et al. | |
| 6,834,073 B1 | 12/2004 | Miller et al. | |
| 6,842,460 B1 | 1/2005 | Olkkonen et al. | |
| 6,927,646 B2 | 8/2005 | Niemi | |
| 6,934,541 B2 | 8/2005 | Miyatani | |
| 6,975,582 B1 | 12/2005 | Karabinis et al. | |
| 6,987,958 B1 | 1/2006 | Lo et al. | |
| 7,068,628 B2 | 6/2006 | Li et al. | |
| 7,154,960 B2 * | 12/2006 | Liu .......................... H04B 7/04 375/267 | |
| 7,177,663 B2 | 2/2007 | Axness et al. | |
| 7,190,964 B2 | 3/2007 | Damnjanovic et al. | |
| 7,257,425 B2 | 8/2007 | Wang et al. | |
| 7,299,072 B2 | 11/2007 | Ninomiya | |
| 7,391,757 B2 | 6/2008 | Haddad et al. | |
| 7,392,015 B1 | 6/2008 | Farlow et al. | |
| 7,474,676 B2 | 1/2009 | Tao et al. | |
| 7,499,109 B2 | 3/2009 | Kim et al. | |
| 7,512,083 B2 | 3/2009 | Li | |
| 7,606,528 B2 | 10/2009 | Mesecher | |
| 7,634,015 B2 | 12/2009 | Waxman | |
| 7,646,744 B2 | 1/2010 | Li | |
| 7,719,993 B2 | 5/2010 | Li et al. | |
| 7,742,000 B2 | 6/2010 | Mohamadi | |
| 7,769,107 B2 | 8/2010 | Sandhu et al. | |
| 7,876,848 B2 * | 1/2011 | Han ........................ H04L 1/0003 375/267 | |
| 7,881,401 B2 | 2/2011 | Kraut et al. | |
| 7,898,478 B2 | 3/2011 | Niu et al. | |
| 7,904,106 B2 * | 3/2011 | Han ........................ H04B 7/043 342/368 | |
| 7,933,255 B2 | 4/2011 | Li | |
| 7,970,366 B2 | 6/2011 | Arita et al. | |
| 8,078,109 B1 | 12/2011 | Mulcay | |
| 8,111,782 B2 * | 2/2012 | Kim ........................ H04B 7/063 375/260 | |
| 8,115,679 B2 | 2/2012 | Falk | |
| 8,155,613 B2 | 4/2012 | Kent et al. | |
| 8,194,602 B2 | 6/2012 | van Rensburg et al. | |
| 8,280,443 B2 | 10/2012 | Tao et al. | |
| 8,294,625 B2 | 10/2012 | Kittinger et al. | |
| 8,306,012 B2 | 11/2012 | Lindoff et al. | |
| 8,315,671 B2 | 11/2012 | Kuwahara et al. | |
| 8,369,436 B2 | 2/2013 | Stirling-Gallacher | |
| 8,504,098 B2 * | 8/2013 | Khojastepour ....... H04B 7/0408 370/203 | |
| 8,509,190 B2 | 8/2013 | Rofougaran | |
| 8,520,657 B2 | 8/2013 | Rofougaran | |
| 8,526,886 B2 | 9/2013 | Wu et al. | |
| 8,571,127 B2 * | 10/2013 | Jiang .................... H04B 7/0417 342/372 | |
| 8,588,844 B2 | 11/2013 | Shpak | |
| 8,599,955 B1 | 12/2013 | Kludt et al. | |
| 8,599,979 B2 | 12/2013 | Farag et al. | |
| 8,605,658 B2 * | 12/2013 | Fujimoto ................ H04B 7/043 370/328 | |
| 8,611,288 B1 | 12/2013 | Zhang et al. | |
| 8,644,413 B2 | 2/2014 | Harel et al. | |
| 8,649,458 B2 | 2/2014 | Kludt et al. | |
| 8,666,319 B2 | 3/2014 | Kloper et al. | |
| 8,670,504 B2 * | 3/2014 | Naguib .................. H04B 7/063 375/299 | |
| 8,744,511 B2 | 6/2014 | Jones et al. | |
| 8,754,810 B2 | 6/2014 | Guo et al. | |
| 8,767,862 B2 | 7/2014 | Abreu et al. | |
| 8,780,743 B2 | 7/2014 | Sombrutzki et al. | |
| 8,797,969 B1 | 8/2014 | Harel et al. | |
| 8,891,598 B1 | 11/2014 | Wang et al. | |
| 8,928,528 B2 | 1/2015 | Harel et al. | |
| 8,942,134 B1 | 1/2015 | Kludt et al. | |
| 8,976,845 B2 | 3/2015 | O'Keeffe et al. | |
| 8,995,416 B2 | 3/2015 | Harel et al. | |
| 9,014,066 B1 | 4/2015 | Wang et al. | |
| 9,035,828 B2 | 5/2015 | O'Keeffe et al. | |
| 2001/0029326 A1 | 10/2001 | Diab et al. | |
| 2001/0038665 A1 | 11/2001 | Baltersee et al. | |
| 2002/0024975 A1 | 2/2002 | Hendler | |
| 2002/0051430 A1 | 5/2002 | Kasami et al. | |
| 2002/0065107 A1 | 5/2002 | Harel et al. | |
| 2002/0085643 A1 | 7/2002 | Kitchener et al. | |
| 2002/0107013 A1 | 8/2002 | Fitzgerald | |
| 2002/0115474 A1 | 8/2002 | Yoshino et al. | |
| 2002/0181426 A1 | 12/2002 | Sherman | |
| 2002/0181437 A1 | 12/2002 | Ohkubo et al. | |
| 2003/0087645 A1 | 5/2003 | Kim et al. | |
| 2003/0114162 A1 | 6/2003 | Chheda et al. | |
| 2003/0153322 A1 | 8/2003 | Burke et al. | |
| 2003/0153360 A1 | 8/2003 | Burke et al. | |
| 2003/0186653 A1 | 10/2003 | Mohebbi et al. | |
| 2003/0203717 A1 | 10/2003 | Chuprun et al. | |
| 2003/0203743 A1 | 10/2003 | Sugar et al. | |
| 2004/0023693 A1 | 2/2004 | Okawa et al. | |
| 2004/0056795 A1 | 3/2004 | Ericson et al. | |
| 2004/0063455 A1 | 4/2004 | Eran et al. | |
| 2004/0081144 A1 | 4/2004 | Martin et al. | |
| 2004/0121810 A1 | 6/2004 | Goransson et al. | |
| 2004/0125899 A1 | 7/2004 | Li et al. | |
| 2004/0125900 A1 * | 7/2004 | Liu et al. ....................... 375/347 | |
| 2004/0142696 A1 | 7/2004 | Saunders et al. | |
| 2004/0147266 A1 | 7/2004 | Hwang et al. | |
| 2004/0156399 A1 | 8/2004 | Eran | |
| 2004/0166902 A1 | 8/2004 | Castellano et al. | |
| 2004/0198292 A1 | 10/2004 | Smith et al. | |
| 2004/0228388 A1 | 11/2004 | Salmenkaita | |
| 2004/0235527 A1 | 11/2004 | Reudink et al. | |
| 2004/0264504 A1 | 12/2004 | Jin | |
| 2005/0068230 A1 | 3/2005 | Munoz et al. | |
| 2005/0068918 A1 | 3/2005 | Mantravadi et al. | |
| 2005/0075140 A1 | 4/2005 | Famolari | |
| 2005/0085266 A1 | 4/2005 | Narita | |
| 2005/0129155 A1 | 6/2005 | Hoshino | |

(56) References Cited

U.S. PATENT DOCUMENTS

| | | |
|---|---|---|
| 2005/0147023 A1 | 7/2005 | Stephens et al. |
| 2005/0163097 A1 | 7/2005 | Do et al. |
| 2005/0245224 A1 | 11/2005 | Kurioka |
| 2005/0250544 A1* | 11/2005 | Grant et al. ................. 455/562.1 |
| 2005/0254513 A1 | 11/2005 | Cave et al. |
| 2005/0265436 A1 | 12/2005 | Suh et al. |
| 2005/0287962 A1 | 12/2005 | Mehta et al. |
| 2006/0041676 A1 | 2/2006 | Sherman |
| 2006/0092889 A1 | 5/2006 | Lyons et al. |
| 2006/0094372 A1 | 5/2006 | Ahn et al. |
| 2006/0098605 A1 | 5/2006 | Li |
| 2006/0111149 A1 | 5/2006 | Chitrapu et al. |
| 2006/0135097 A1 | 6/2006 | Wang et al. |
| 2006/0183503 A1 | 8/2006 | Goldberg |
| 2006/0203850 A1 | 9/2006 | Johnson et al. |
| 2006/0227854 A1 | 10/2006 | McCloud et al. |
| 2006/0264184 A1 | 11/2006 | Li et al. |
| 2006/0270343 A1 | 11/2006 | Cha et al. |
| 2006/0271969 A1 | 11/2006 | Takizawa et al. |
| 2006/0285507 A1 | 12/2006 | Kinder et al. |
| 2007/0041398 A1 | 2/2007 | Benveniste |
| 2007/0058581 A1 | 3/2007 | Benveniste |
| 2007/0076675 A1 | 4/2007 | Chen |
| 2007/0093261 A1 | 4/2007 | Hou et al. |
| 2007/0097918 A1 | 5/2007 | Cai et al. |
| 2007/0115914 A1 | 5/2007 | Ohkubo et al. |
| 2007/0152903 A1 | 7/2007 | Lin et al. |
| 2007/0217352 A1 | 9/2007 | Kwon |
| 2007/0223380 A1 | 9/2007 | Gilbert et al. |
| 2007/0249386 A1 | 10/2007 | Bennett |
| 2007/0298742 A1 | 12/2007 | Ketchum et al. |
| 2008/0043867 A1 | 2/2008 | Blanz et al. |
| 2008/0051037 A1* | 2/2008 | Molnar ................. H04B 7/0632 455/70 |
| 2008/0081671 A1 | 4/2008 | Wang et al. |
| 2008/0125120 A1 | 5/2008 | Gallagher et al. |
| 2008/0144737 A1* | 6/2008 | Naguib ........................ 375/299 |
| 2008/0165732 A1 | 7/2008 | Kim et al. |
| 2008/0238808 A1 | 10/2008 | Arita et al. |
| 2008/0240314 A1 | 10/2008 | Gaal et al. |
| 2008/0247370 A1 | 10/2008 | Gu et al. |
| 2008/0267142 A1 | 10/2008 | Mushkin et al. |
| 2008/0280571 A1 | 11/2008 | Rofougaran et al. |
| 2008/0285637 A1 | 11/2008 | Liu et al. |
| 2009/0003299 A1 | 1/2009 | Cave et al. |
| 2009/0028225 A1 | 1/2009 | Runyon et al. |
| 2009/0046638 A1 | 2/2009 | Rappaport et al. |
| 2009/0058724 A1 | 3/2009 | Xia et al. |
| 2009/0121935 A1 | 5/2009 | Xia et al. |
| 2009/0137206 A1 | 5/2009 | Sherman et al. |
| 2009/0154419 A1 | 6/2009 | Yoshida et al. |
| 2009/0187661 A1 | 7/2009 | Sherman |
| 2009/0190541 A1 | 7/2009 | Abedi |
| 2009/0227255 A1 | 9/2009 | Thakare |
| 2009/0239486 A1 | 9/2009 | Sugar et al. |
| 2009/0268616 A1* | 10/2009 | Hosomi ........................ 370/241 |
| 2009/0279478 A1 | 11/2009 | Nagaraj et al. |
| 2009/0285331 A1 | 11/2009 | Sugar et al. |
| 2009/0322610 A1 | 12/2009 | Hants et al. |
| 2009/0322613 A1 | 12/2009 | Bala et al. |
| 2010/0002656 A1 | 1/2010 | Ji et al. |
| 2010/0037111 A1 | 2/2010 | Ziaja et al. |
| 2010/0040369 A1 | 2/2010 | Zhao et al. |
| 2010/0067473 A1 | 3/2010 | Cave et al. |
| 2010/0087227 A1 | 4/2010 | Francos et al. |
| 2010/0111039 A1 | 5/2010 | Kim et al. |
| 2010/0117890 A1 | 5/2010 | Vook et al. |
| 2010/0135420 A1 | 6/2010 | Xu et al. |
| 2010/0150013 A1 | 6/2010 | Hara et al. |
| 2010/0172429 A1 | 7/2010 | Nagahama et al. |
| 2010/0195560 A1 | 8/2010 | Nozaki et al. |
| 2010/0195601 A1 | 8/2010 | Zhang |
| 2010/0208712 A1 | 8/2010 | Wax et al. |
| 2010/0222011 A1 | 9/2010 | Behzad |
| 2010/0234071 A1 | 9/2010 | Shabtay et al. |
| 2010/0278063 A1 | 11/2010 | Kim et al. |
| 2010/0283692 A1 | 11/2010 | Achour et al. |
| 2010/0285752 A1 | 11/2010 | Lakshmanan et al. |
| 2010/0291931 A1 | 11/2010 | Suemitsu et al. |
| 2010/0303170 A1 | 12/2010 | Zhu et al. |
| 2010/0316043 A1 | 12/2010 | Doi et al. |
| 2011/0019639 A1 | 1/2011 | Karaoguz et al. |
| 2011/0032849 A1 | 2/2011 | Yeung et al. |
| 2011/0032972 A1 | 2/2011 | Wang et al. |
| 2011/0085532 A1 | 4/2011 | Scherzer et al. |
| 2011/0105036 A1 | 5/2011 | Rao et al. |
| 2011/0116489 A1 | 5/2011 | Grandhi |
| 2011/0134816 A1 | 6/2011 | Liu et al. |
| 2011/0150050 A1 | 6/2011 | Trigui et al. |
| 2011/0150066 A1 | 6/2011 | Fujimoto |
| 2011/0151826 A1 | 6/2011 | Miller et al. |
| 2011/0163913 A1 | 7/2011 | Cohen et al. |
| 2011/0205883 A1 | 8/2011 | Mihota |
| 2011/0205998 A1 | 8/2011 | Hart et al. |
| 2011/0228742 A1 | 9/2011 | Honkasalo et al. |
| 2011/0249576 A1 | 10/2011 | Chrisikos et al. |
| 2011/0273977 A1 | 11/2011 | Shapira et al. |
| 2011/0281541 A1 | 11/2011 | Borremans |
| 2011/0299437 A1 | 12/2011 | Mikhemar et al. |
| 2011/0310827 A1 | 12/2011 | Srinivasa et al. |
| 2011/0310853 A1* | 12/2011 | Yin et al. ........................ 370/335 |
| 2012/0014377 A1 | 1/2012 | Joergensen et al. |
| 2012/0015603 A1 | 1/2012 | Proctor et al. |
| 2012/0020396 A1* | 1/2012 | Hohne et al. ................... 375/224 |
| 2012/0027000 A1 | 2/2012 | Wentink |
| 2012/0028671 A1 | 2/2012 | Niu et al. |
| 2012/0033761 A1 | 2/2012 | Guo et al. |
| 2012/0034952 A1 | 2/2012 | Lo et al. |
| 2012/0045003 A1 | 2/2012 | Li et al. |
| 2012/0051287 A1 | 3/2012 | Merlin et al. |
| 2012/0064838 A1 | 3/2012 | Miao et al. |
| 2012/0069828 A1 | 3/2012 | Taki et al. |
| 2012/0076028 A1 | 3/2012 | Ko et al. |
| 2012/0076229 A1 | 3/2012 | Brobston et al. |
| 2012/0088512 A1* | 4/2012 | Yamada et al. ................. 455/450 |
| 2012/0092217 A1 | 4/2012 | Hosoya et al. |
| 2012/0100802 A1 | 4/2012 | Mohebbi |
| 2012/0115523 A1 | 5/2012 | Shpak |
| 2012/0155349 A1 | 6/2012 | Bajic et al. |
| 2012/0155397 A1 | 6/2012 | Shaffer et al. |
| 2012/0163257 A1 | 6/2012 | Kim et al. |
| 2012/0163302 A1 | 6/2012 | Takano |
| 2012/0170453 A1 | 7/2012 | Tiwari |
| 2012/0170672 A1 | 7/2012 | Sondur |
| 2012/0201153 A1 | 8/2012 | Bharadia et al. |
| 2012/0201173 A1 | 8/2012 | Jain et al. |
| 2012/0207256 A1 | 8/2012 | Farag et al. |
| 2012/0212372 A1 | 8/2012 | Petersson et al. |
| 2012/0213065 A1 | 8/2012 | Koo et al. |
| 2012/0218962 A1 | 8/2012 | Kishiyama et al. |
| 2012/0220331 A1 | 8/2012 | Luo et al. |
| 2012/0230380 A1* | 9/2012 | Keusgen .............. H04B 7/0482 375/227 |
| 2012/0251031 A1 | 10/2012 | Suarez et al. |
| 2012/0270531 A1 | 10/2012 | Wright et al. |
| 2012/0270544 A1 | 10/2012 | Shah |
| 2012/0281598 A1 | 11/2012 | Struhsaker et al. |
| 2012/0314570 A1 | 12/2012 | Forenza et al. |
| 2012/0321015 A1 | 12/2012 | Hansen et al. |
| 2012/0327870 A1 | 12/2012 | Grandhi et al. |
| 2013/0010623 A1 | 1/2013 | Golitschek |
| 2013/0012134 A1 | 1/2013 | Jin et al. |
| 2013/0017794 A1 | 1/2013 | Kloper et al. |
| 2013/0023225 A1 | 1/2013 | Weber |
| 2013/0044877 A1 | 2/2013 | Liu et al. |
| 2013/0051283 A1 | 2/2013 | Lee et al. |
| 2013/0058239 A1 | 3/2013 | Wang et al. |
| 2013/0070741 A1 | 3/2013 | Li et al. |
| 2013/0079048 A1 | 3/2013 | Cai et al. |
| 2013/0094437 A1 | 4/2013 | Bhattacharya |
| 2013/0094621 A1 | 4/2013 | Luo et al. |
| 2013/0095780 A1 | 4/2013 | Prazan et al. |
| 2013/0101073 A1 | 4/2013 | Zai et al. |
| 2013/0156016 A1 | 6/2013 | Debnath et al. |

(56) References Cited

U.S. PATENT DOCUMENTS

| | | | |
|---|---|---|---|
| 2013/0156120 | A1 | 6/2013 | Josiam et al. |
| 2013/0170388 | A1 | 7/2013 | Ito et al. |
| 2013/0188541 | A1 | 7/2013 | Fischer |
| 2013/0190006 | A1 | 7/2013 | Kazmi et al. |
| 2013/0208587 | A1 | 8/2013 | Bala et al. |
| 2013/0208619 | A1 | 8/2013 | Kudo et al. |
| 2013/0223400 | A1 | 8/2013 | Seo et al. |
| 2013/0229996 | A1 | 9/2013 | Wang et al. |
| 2013/0229999 | A1 | 9/2013 | Da Silva et al. |
| 2013/0235720 | A1 | 9/2013 | Wang et al. |
| 2013/0242853 | A1 | 9/2013 | Seo et al. |
| 2013/0242899 | A1 | 9/2013 | Lysejko et al. |
| 2013/0242965 | A1 | 9/2013 | Horn et al. |
| 2013/0242976 | A1 | 9/2013 | Katayama et al. |
| 2013/0272437 | A1 | 10/2013 | Eidson et al. |
| 2013/0301551 | A1 | 11/2013 | Ghosh et al. |
| 2013/0304962 | A1 | 11/2013 | Yin et al. |
| 2013/0331136 | A1 | 12/2013 | Yang et al. |
| 2013/0343369 | A1 | 12/2013 | Yamaura |
| 2014/0010089 | A1 | 1/2014 | Cai et al. |
| 2014/0010211 | A1 | 1/2014 | Asterjadhi et al. |
| 2014/0029433 | A1 | 1/2014 | Wentink |
| 2014/0071873 | A1 | 3/2014 | Wang et al. |
| 2014/0079016 | A1 | 3/2014 | Dai et al. |
| 2014/0086077 | A1 | 3/2014 | Safavi |
| 2014/0086081 | A1 | 3/2014 | Mack et al. |
| 2014/0098681 | A1 | 4/2014 | Stager et al. |
| 2014/0119288 | A1 | 5/2014 | Zhu et al. |
| 2014/0185501 | A1 | 7/2014 | Park et al. |
| 2014/0185535 | A1 | 7/2014 | Park et al. |
| 2014/0192820 | A1 | 7/2014 | Azizi et al. |
| 2014/0204821 | A1 | 7/2014 | Seok et al. |
| 2014/0242914 | A1 | 8/2014 | Monroe |
| 2014/0269409 | A1 | 9/2014 | Dimou et al. |
| 2014/0307653 | A1 | 10/2014 | Liu et al. |
| 2015/0016438 | A1 | 1/2015 | Harel et al. |
| 2015/0018042 | A1 | 1/2015 | Radulescu et al. |
| 2015/0085777 | A1 | 3/2015 | Seok |
| 2015/0124634 | A1 | 5/2015 | Harel et al. |
| 2015/0139212 | A1 | 5/2015 | Wang et al. |

FOREIGN PATENT DOCUMENTS

| | | |
|---|---|---|
| JP | 2009-278444 | 11/2009 |
| WO | WO 03/047033 | 6/2003 |
| WO | WO 03/073645 | 9/2003 |
| WO | WO 2010/085854 | 8/2010 |
| WO | WO 2011/060058 | 5/2011 |

OTHER PUBLICATIONS

Office Action issued by the United States Patent and Trademark Office for U.S. Appl. No. 13/630,146 dated Mar. 27, 2013.
Office Action issued by the United States Patent and Trademark Office for U.S. Appl. No. 13/762,159 dated Apr. 16, 2013.
Office Action issued by the United States Patent and Trademark Office for U.S. Appl. No. 13/762,191 dated May 2, 2013.
Office Action issued by the United States Patent and Trademark Office for U.S. Appl. No. 13/762,188 dated May 15, 2013.
Office Action issued by the United States Patent and Trademark Office for U.S. Appl. No. 13/776,204 dated May 21, 2013.
Office Action issued by the United States Patent and Trademark Office for U.S. Appl. No. 13/770,255 dated Jun. 6, 2013.
Office Action issued by the United States Patent and Trademark Office for U.S. Appl. No. 13/776,068 dated Jun. 11, 2013.
Notice of Allowance issued by the United States Patent and Trademark Office for U.S. Appl. No. 13/762,159 dated Jun. 20, 2013.
Notice of Allowance issued by the United States Patent and Trademark Office for U.S. Appl. No. 13/762,191 dated Jul. 19, 2013.
Notice of Allowance issued by the United States Patent and Trademark Office for U.S. Appl. No. 13/630,146 dated Jul. 31, 2013.
Notice of Allowance issued by the United States Patent and Trademark Office for U.S. Appl. No. 13/762,188 dated Aug. 19, 2013.
Notice of Allowance issued by the United States Patent and Trademark Office for U.S. Appl. No. 13/770,255 dated Sep. 17, 2013.
Ahmadi-Shokouh et al., "Pre-LNA Smart Soft Antenna Selection for MIMO Spatial Multiplexing/Diversity System when Amplifier/Sky Noise Dominates", European Transactions on Telecommunications, Wiley & Sons, Chichester, GB, vol. 21, No. 7, Nov. 1, 2010, pp. 663-677.
Office Action issued by the United States Patent and Trademark Office for U.S. Appl. No. 13/889,150 dated Sep. 25, 2013.
Office Action issued by the United States Patent and Trademark Office for U.S. Appl. No. 13/955,320 dated Oct. 15, 2013.
Office Action issued by the United States Patent and Trademark Office for U.S. Appl. No. 13/776,204 dated Oct. 23, 2013.
Office Action issued by the United States Patent and Trademark Office for U.S. Appl. No. 13/925,454 dated Oct. 28, 2013.
Office Action issued by the United States Patent and Trademark Office for U.S. Appl. No. 13/955,194 dated Oct. 30, 2013.
Office Action issued by the United States Patent and Trademark Office for U.S. Appl. No. 14/013,190 dated Nov. 5, 2013.
Office Action issued by the United States Patent and Trademark Office for U.S. Appl. No. 13/776,068 dated Nov. 5, 2013.
Office Action issued by the United States Patent and Trademark Office for U.S. Appl. No. 14/010,771 dated Dec. 17, 2013.
Office Action issued by the United States Patent and Trademark Office for U.S. Appl. No. 14/065,182 dated Dec. 17, 2013.
Office Action issued by the United States Patent and Trademark Office for U.S. Appl. No. 14/068,863 dated Dec. 17, 2013.
Office Action issued by the United States Patent and Trademark Office for U.S. Appl. No. 14/011,521 dated Dec. 23, 2013.
Office Action issued by the United States Patent and Trademark Office for U.S. Appl. No. 14/018,965 dated Jan. 13, 2014.
Office Action issued by the United States Patent and Trademark Office for U.S. Appl. No. 13/858,302 dated Jan. 16, 2014.
Office Action issued by the United States Patent and Trademark Office for U.S. Appl. No. 14/042,020 dated Jan. 16, 2014.
Office Action issued by the United States Patent and Trademark Office for U.S. Appl. No. 14/102,539 dated Jan. 27, 2014.
Office Action issued by the United States Patent and Trademark Office for U.S. Appl. No. 14/087,376 dated Jan. 29, 2014.
Notice of Allowance issued by the United States Patent and Trademark Office for U.S. Appl. No. 13/776,204 dated Jan. 31, 2014.
Office Action issued by the United States Patent and Trademark Office for U.S. Appl. No. 14/094,644 dated Feb. 6, 2014.
Notice of Allowance issued by the United States Patent and Trademark Office for U.S. Appl. No. 13/955,320 dated Feb. 21, 2014.
Huang et al., "Antenna Mismatch and Calibration Problem in Coordinated Multi-point Transmission System," IET Communications, 2012, vol. 6, Issue 3, pp. 289-299.
Office Action issued by the United States Patent and Trademark Office for U.S. Appl. No. 14/109,904 dated Feb. 27, 2014.
Office Action issued by the United States Patent and Trademark Office for U.S. Appl. No. 13/925,454 dated Mar. 7, 2014.
Notice of Allowance issued by the United States Patent and Trademark Office for U.S. Appl. No. 14/172,500 dated Mar. 26, 2014.
Notice of Allowance issued by the United States Patent and Trademark Office for U.S. Appl. No. 14/065,182 dated Mar. 25, 2014.
Notice of Allowance issued by the United States Patent and Trademark Office for U.S. Appl. No. 14/068,863 dated Mar. 25, 2014.
Office Action issued by the United States Patent and Trademark Office for U.S. Appl. No. 14/010,771 dated Apr. 4, 2014.
Office Action issued by the United States Patent and Trademark Office for U.S. Appl. No. 14/085,352 dated Apr. 7, 2014.
Office Action issued by the United States Patent and Trademark Office for U.S. Appl. No. 13/889,150 dated Apr. 9, 2014.
Notice of Allowance issued by the United States Patent and Trademark Office for U.S. Appl. No. 13/955,194 dated Apr. 9, 2014.
Office Action issued by the United States Patent and Trademark Office for U.S. Appl. No. 14/097,765 dated Apr. 22, 2014.
Notice of Allowance issued by the United States Patent and Trademark Office for U.S. Appl. No. 14/087,376 dated May 9, 2014.
Office Action issued by the United States Patent and Trademark Office for U.S. Appl. No. 14/143,580 dated May 9, 2014.

(56) References Cited

OTHER PUBLICATIONS

Notice of Allowance issued by the United States Patent and Trademark Office for U.S. Appl. No. 13/776,068 dated May 13, 2014.
Office Action issued by the United States Patent and Trademark Office for U.S. Appl. No. 14/013,190 dated May 20, 2014.
Office Action issued by the United States Patent and Trademark Office for U.S. Appl. No. 14/085,252 dated Jun. 18, 2014.
Office Action issued by the United States Patent and Trademark Office for U.S. Appl. No. 14/094,644 dated Jun. 24, 2014.
Notice of Allowance issued by the United States Patent and Trademark Office for U.S. Appl. No. 14/102,539 dated Jun. 24, 2014.
Office Action issued by the United States Patent and Trademark Office for U.S. Appl. No. 14/011,521 dated Jul. 1, 2014.
Notice of Allowance issued by the United States Patent and Trademark Office for U.S. Appl. No. 14/109,904 dated Jul. 2, 2014.
Notice of Allowance issued by the United States Patent and Trademark Office for U.S. Appl. No. 13/889,150 dated Jul. 8, 2014.
Office Action issued by the United States Patent and Trademark Office for U.S. Appl. No. 14/250,767 dated Jul. 10, 2014.
Notice of Allowance issued by the United States Patent and Trademark Office for U.S. Appl. No. 14/085,352 dated Jul. 23, 2014.
Notice of Allowance issued by the United States Patent and Trademark Office for U.S. Appl. No. 14/013,190 dated Jul. 25, 2014.
Office Action issued by the United States Patent and Trademark Office for U.S. Appl. No. 14/198,280 dated Jul. 29, 2014.
Office Action issued by the United States Patent and Trademark Office for U.S. Appl. No. 14/042,020 dated Jul. 31, 2014.
Notice of Allowance issued by the United States Patent and Trademark Office for U.S. Appl. No. 14/010,771 dated Aug. 6, 2014.
Office Action issued by the United States Patent and Trademark Office for U.S. Appl. No. 14/306,458 dated Aug. 13, 2014.
Office Action issued by the United States Patent and Trademark Office for U.S. Appl. No. 14/297,898 dated Aug. 15, 2014.
Notice of Allowance issued by the United States Patent and Trademark Office for U.S. Appl. No. 14/085,252 dated Aug. 27, 2014.
Office Action issued by the United States Patent and Trademark Office for U.S. Appl. No. 14/181,844 dated Aug. 29, 2014.
Office Action issued by the United States Patent and Trademark Office for U.S. Appl. No. 14/296,209 dated Sep. 4, 2014.
Notice of Allowance issued by the United States Patent and Trademark Office for U.S. Appl. No. 14/097,765 dated Sep. 8, 2014.
Notice of Allowance issued by the United States Patent and Trademark Office for U.S. Appl. No. 14/143,580 dated Sep. 8, 2014.
Office Action issued by the United States Patent and Trademark Office for U.S. Appl. No. 14/198,155 dated Sep. 12, 2014.
Office Action issued by the United States Patent and Trademark Office for U.S. Appl. No. 14/173,640 dated Oct. 6, 2014.
Office Action issued by the United States Patent and Trademark Office for U.S. Appl. No. 14/449,431 dated Oct. 10, 2014.
Office Action issued by the United States Patent and Trademark Office for U.S. Appl. No. 14/171,736 dated Oct. 16, 2014.
Notice of Allowance issued by the United States Patent and Trademark Office for U.S. Appl. No. 14/011,521 dated Oct. 20, 2014.
Office Action issued by the United States Patent and Trademark Office for U.S. Appl. No. 14/320,920 dated Oct. 23, 2014.
Notice of Allowance issued by the United States Patent and Trademark Office for U.S. Appl. No. 13/889,150 dated Nov. 10, 2014.
Notice of Allowance issued by the United States Patent and Trademark Office for U.S. Appl. No. 14/198,280 dated Nov. 18, 2014.
Office Action issued by the United States Patent and Trademark Office for U.S. Appl. No. 14/480,920 dated Nov. 18, 2014.
Office Action issued by the United States Patent and Trademark Office for U.S. Appl. No. 14/481,319 dated Nov. 19, 2014.
Office Action issued by the United States Patent and Trademark Office for U.S. Appl. No. 14/273,866 dated Nov. 28, 2014.
Office Action issued by the United States Patent and Trademark Office for U.S. Appl. No. 14/042,020 dated Dec. 1, 2014.
Office Action issued by the United States Patent and Trademark Office for U.S. Appl. No. 13/888,057 dated Dec. 3, 2014.
Notice of Allowance issued by the United States Patent and Trademark Office for U.S. Appl. No. 14/297,898 dated Dec. 5, 2014.
Notice of Allowance issued by the United States Patent and Trademark Office for U.S. Appl. No. 14/281,358 dated Dec. 16, 2014.
Office Action issued by the United States Patent and Trademark Office for U.S. Appl. No. 14/250,767 dated Dec. 26, 2014.
Notice of Allowance issued by the United States Patent and Trademark Office for U.S. Appl. No. 14/097,765 dated Dec. 31, 2014.
Office Action issued by the United States Patent and Trademark Office for U.S. Appl. No. 14/181,844 dated Jan. 5, 2015.
Office Action issued by the United States Patent and Trademark Office for U.S. Appl. No. 14/306,458 dated Jan. 9, 2015.
Notice of Allowance issued by the United States Patent and Trademark Office for U.S. Appl. No. 14/171,736 mailed Feb. 20, 2015.
Office Action issued by the United States Patent and Trademark Office for U.S. Appl. No. 14/320,920 dated Feb. 23, 2015.
Office Action issued by the United States Patent and Trademark Office for U.S. Appl. No. 13/775,886 dated Mar. 23, 2015.
Notice of Allowance issued by the United States Patent and Trademark Office for U.S. Appl. No. 14/449,431 dated Mar. 23, 2015.
Notice of Allowance issued by the United States Patent and Trademark Office for U.S. Appl. No. 14/273,866 dated Mar. 25, 2015.
Office Action issued by the United States Patent and Trademark Office for U.S. Appl. No. 14/517,114 dated Apr. 6, 2015.
Notice of Allowance issued by the United States Patent and Trademark Office for U.S. Appl. No. 13/925,454 dated Apr. 14, 2015.
Office Action issued by the United States Patent and Trademark Office for U.S. Appl. No. 14/543,357 dated Apr. 23, 2015.
Office Action issued by the United States Patent and Trademark Office for U.S. Appl. No. 14/450,625 dated Apr. 28, 2015.
Office Action issued by the United States Patent and Trademark Office for U.S. Appl. No. 14/250,767 dated Apr. 29, 2015.
Office Action issued by the United States Patent and Trademark Office for U.S. Appl. No. 14/320,920 dated May 29, 2015.
Office Action issued by the United States Patent and Trademark Office for U.S. Appl. No. 14/481,319 dated Jun. 12, 2015.
Notice of Allowance issued by the United States Patent and Trademark Office for U.S. Appl. No. 14/505,655 dated Jun. 17, 2015.
Office Action issued by the United States Patent and Trademark Office for U.S. Appl. No. 14/472,759 dated Jun. 18, 2015.
Office Action issued by the United States Patent and Trademark Office for U.S. Appl. No. 14/042,020 dated Jun. 19, 2015.
Notice of Allowance issued by the United States Patent and Trademark Office for U.S. Appl. No. 14/480,920 dated Jun. 22, 2015.
International Search Report and Written Opinion for PCT International Application No. PCT/US2014/062116 dated Jun. 22, 2015.
Office Action issued by the United States Patent and Trademark Office for U.S. Appl. No. 14/467,415 dated Jun. 30, 2015.
International Search Report and Written Opinion for PCT International Application No. PCT/US2014/063304 dated Jul. 8, 2015.
Bandyopadhyay, S. et al., "An Adaptive MAC Protocol for Wireless Ad Hoc Community Network (WACNet) Using Electronically Steerable Passive Array Radiator Antenna", Globecom '01 : IEEE Global Telecommunications Conference; San Antonio, Texas, USA, Nov. 25-29, 2001, IEEE Operations Center, Piscataway, NJ, vol. 5, Nov. 25, 2001, pp. 2896-2900.
Du, Yongjiu et al., "iBeam: Intelligent Client-Side Multi-User Beamforming in Wireless Networks", IEEE INFOCOM 2014—IEEE Conference on Computer Communications, IEEE, Apr. 27, 2014, pp. 817-825.
Office Action issued by the United States Patent and Trademark Office for U.S. Appl. No. 13/888,057 dated Jul. 9, 2015.
Office Action issued by the United States Patent and Trademark Office for U.S. Appl. No. 14/173,640 dated Jul. 16, 2015.
Office Action issued by the United States Patent and Trademark Office for U.S. Appl. No. 14/517,114 dated Jul. 28, 2015.
Office Action issued by the United States Patent and Trademark Office for U.S. Appl. No. 14/672,634 dated Aug. 12, 2015.

* cited by examiner

_400_

410 — PICK BEAMFORMERS ONE BY ONE FOR ANTENNA GRADING LOOK-THROUGH WHILE MAINTAINING THE OTHER BEAMFORMERS IN NORMAL OPERATION

420 — GRADE THE PICKED BEAMFORMERS ANTENNAS ONE BY ONE, USING MCS MEASUREMENTS VARIATION (VIA ANTENNA'S COMBINER BYPASS)

430 — PICK A BEST-GRADED ANTENNA AS AN ANCHOR

440 — PAIR THE ANCHOR WITH EACH OF THE OTHER ANTENNAS ONE BY ONE, EACH TIME MEASURING MCS IN BOTH ZERO AND 180° PHASE DIFFERENCE

450 — GRADE THE PAIRS BY USING A BEST PHASE DIFFERENCE (PER THE MCS), AND COMPARE PAIR S PERFORMANCE

460 — SELECT ANCHOR, BEST-PAIRED ANTENNA, THE NEXT BEST PAIRED ANTENNA ETC. TILL L ANTENNAS CHOSEN

END

Figure 4

IMPLEMENTING TRANSMIT RDN ARCHITECTURES IN UPLINK MIMO SYSTEMS

CROSS-REFERENCE TO RELATED APPLICATIONS

This application claims benefit from U.S. provisional patent applications: 61/658,014 filed on Jun. 11, 2012; 61/658,009 filed on Jun. 11, 2012; 61/665,592 filed on Jun. 28, 2012; 61/665,597 filed on Jun. 28, 2012; and 61/665,638 filed on Jun. 28, 2012, all of which are incorporated herein by reference in their entirety.

FIELD OF THE INVENTION

The present invention relates generally to the field of radio frequency (RF) multiple-input-multiple-output (MIMO) systems and in particular to systems and methods for enhanced performance of RF MIMO systems using RF beamforming and/or digital signal processing.

BACKGROUND

Prior to setting forth a short discussion of the related art, it may be helpful to set forth definitions of certain terms that will be used hereinafter.

The term "MIMO" as used herein, is defined as the use of multiple antennas at both the transmitter and receiver to improve communication performance, where more than one radio, supported by digital signal processing are used. MIMO offers significant increases in data throughput and link range without additional bandwidth or increased transmit power. It achieves this goal by spreading the transmit power over or collecting the received signal from the antennas to achieve spatial multiplexing that improves the spectral efficiency (more bits per second per Hz of bandwidth) or to achieve a diversity gain that improves the link reliability (reduced fading), or increased antenna directivity.

The term "beamforming" sometimes referred to as "spatial filtering" as used herein, is a signal processing technique used in antenna arrays for directional signal transmission or reception. This is achieved by combining elements in the array in such a way that signals at particular angles experience constructive interference while others experience destructive interference. Beamforming can be used at both the transmitting and receiving ends in order to achieve spatial selectivity.

The term "beamformer" as used herein refers to RF circuitry that implements transmit or receive beamforming and usually includes a splitter/combiner and may further include switches, controllable phase shifters, and in some cases controllable amplifiers and/or controllable attenuators.

The term "Transmit Radio Distribution Network" or "Tx RDN" or simply "RDN" as used herein is defined as a group of beamformers as set forth above.

The term "hybrid MIMO RDN" as used herein is defined as a MIMO system that employ two or more antennas per channel (N is the number of channels and M is the total number of antennas and M>N). This architecture employs a beamformer for each channel so that the radio circuit is connected to a splitter going to two or more antennas where phase and amplitude of each antenna signal could be adjusted individually.

In hybrid MIMO RDN transmitting systems, when the phases of the transmitted signals from each antenna are properly adjusted with respect to one another, the individual signals may be combined and result in an improved SINR for the receiving system.

FIG. 1 is a block diagram illustrating a standard 3G-4G cellular communication system 10 having a base station (BTS) 20 equipped with P antennas, 22-1 to 22-P. Additionally, a user equipment (UE) 11 in a MIMO configuration is shown. UE 11 includes an N channels MIMO baseband module 12 connected to N receivers 14-1 to 14-N and N transmitters 16-1 to 16-N in a duplex configuration which couples receivers and transmitters of the same channel to a corresponding antenna 18-1 to 18-N.

In operation, and in accordance with known 3G-4G standards, UE 11 transmits via antennas 18-1 to 18-N to base station 20 over an uplink channel (UL) both data and pilot signals. The signal properties of the pilot signals are known to base station 20 and once received by base station antennas 22-1 to 22-P a channel estimation operation is applied. Consequently, the phase of each and every transmitting antenna 18-1 to 18-N can be derived for the MIMO demodulation. This channel estimation information is then used to derive the best pre-coding weight and feed back to UE 11 in the form of a codebook over the downlink channel (DL). The code book includes phases that are to be applied to the respective transmit antenna so that the multiple signal streams can be de-correlated, and separated cleanly. In addition, the SINR of each signal stream at the base station receiver has to be maintained at certain levels to guarantee the quality of service. In 3G (CDMA/UMTS/HSPA) network, base station feeds back power control bit to maintain the SINR. In addition, the data rate for each data stream could change per TTI (2 ms or 10 ms). Both data rate and power control (i.e., TX power) can be used as the metrics of beamformer performance. In 4G (LTE), Modulation and Coding Scheme (MCS) is fed back to UE to change the transmit data rate for maintaining the service quality.

While the aforementioned mechanism is straightforward to apply in standard MIMO, it would be challenging to achieve in MIMO RDN architecture where there are more transmit antennas (M) than pilot signals (N) in accordance with the 3G-4G standards. Additionally, it would be impossible to determine, when a plurality of UE transmit signals are combined how the phase shift of each of the transmit antennas contributes to the combined pilot signal associated with transmit antennas with a common beamformer. It would be therefore advantageous to find a solution for using existing feedback to UE from the BTS, in order to better adjust the phases of the UE transmit antennas in MIMO RDN configuration.

SUMMARY

According to one aspect of the present invention, a system is provided for implementing RDN architecture for transmitting the uplink channel in MIMO. The system includes a multiple-input-multiple-output (MIMO) transmitting system comprising a MIMO baseband module having N branches; and a radio distribution network (RDN) connected to the MIMO transmitting system, the RDN comprising at least one beamformer, wherein each of the beamformers feeds or provides input to K transmit antennas, so that a total number of transmit antennas in the system is M=N*K, wherein each of the beamformers includes a passive splitter configured to split the signal coming from the transmitter into multiple signals which are weighted individually going or being supplied to each transmit antenna, wherein the baseband module is configured to perform blind scan process which uses MCS as a quality indicator. The blind process may be performed by manipulating antennas; initially, when none of the beamformers are tuned, a single antenna is chosen for each un-tuned beamformer; once all are tuned, iterative tuning is performed in a round robin sequence (or some other sequence); during such iterations, while one beamformer undergoes tuning the others freeze the weights of their set of antennas.

According to some embodiments of the present invention, a Mobility Monitoring Indicator (MMI) can be used to help determining the number of active antennas for a beamformer. MMI can be used in the system to help to optimize the beamformers.

These additional, and/or other aspects and/or advantages of the present invention are set forth in the detailed description which follows.

BRIEF DESCRIPTION OF THE DRAWINGS

For a better understanding of the invention and in order to show how it may be implemented, references are made, purely by way of example, to the accompanying drawings in which like numerals designate corresponding elements or sections. In the accompanying drawings:

FIG. 4 is a more detailed flowchart illustrating one aspect according to some embodiments of the present invention.

Figure 1:
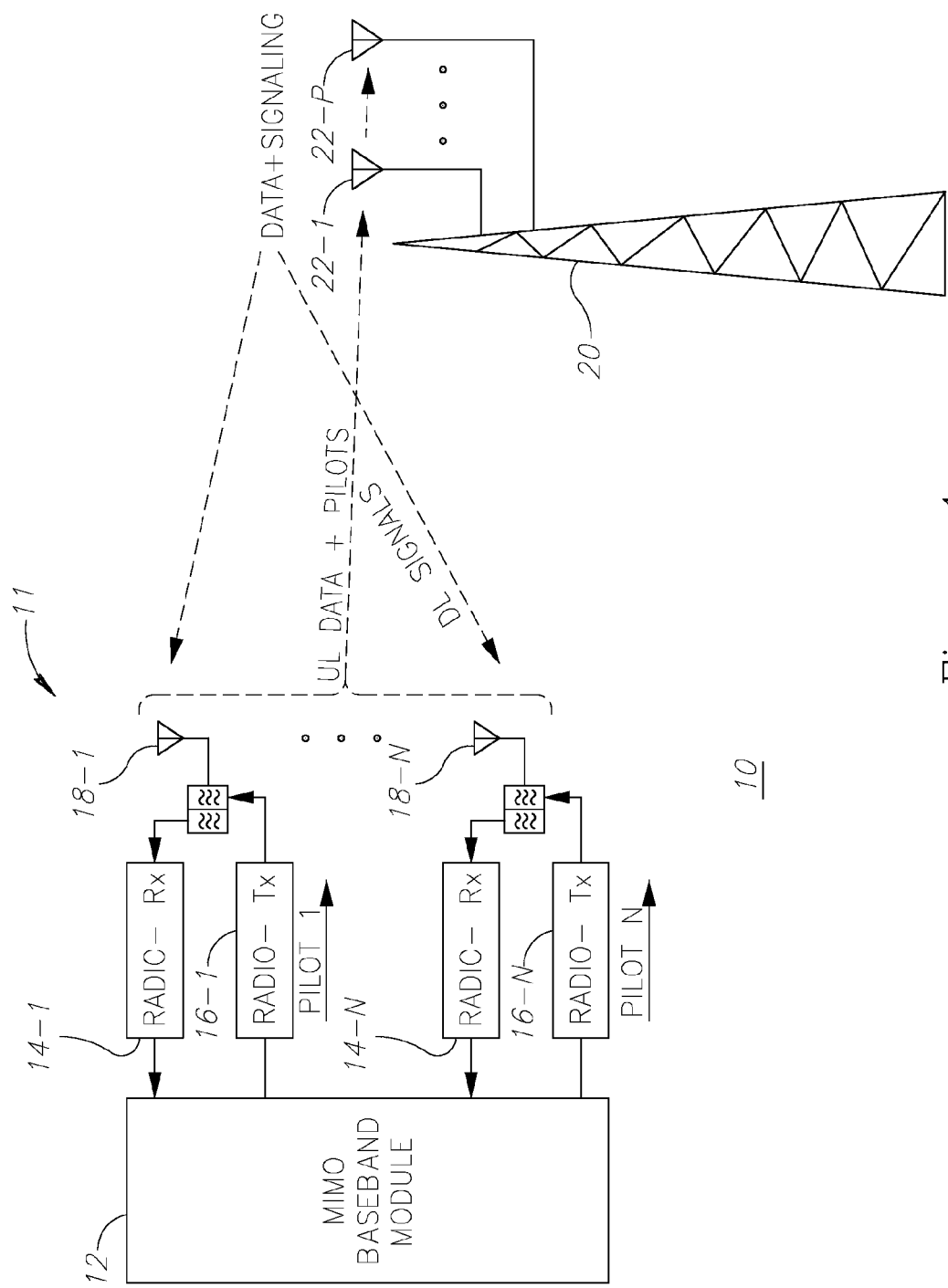
FIG. 1 is a high level block diagram illustrating a system according to the prior art.

The drawings together with the following detailed description make the embodiments of the invention apparent to those skilled in the art.

DETAILED DESCRIPTION

With specific reference now to the drawings in detail, it is stressed that the particulars shown are for the purpose of example and solely for discussing the preferred embodiments of the present invention, and are presented in the cause of providing what is believed to be the most useful and readily understood description of the principles and conceptual aspects of the invention. In this regard, no attempt is made to show structural details of the invention in more detail than is necessary for a fundamental understanding of the invention. The description taken with the drawings makes apparent to those skilled in the art how the several forms of the invention may be embodied in practice.

Before explaining the embodiments of the invention in detail, it is to be understood that the invention is not limited in its application to the details of construction and the arrangement of the components set forth in the following descriptions or illustrated in the drawings. The invention is applicable to other embodiments and may be practiced or carried out in various ways. Also, it is to be understood that the phraseology and terminology employed herein is for the purpose of description and should not be regarded as limiting.

Figure 2:
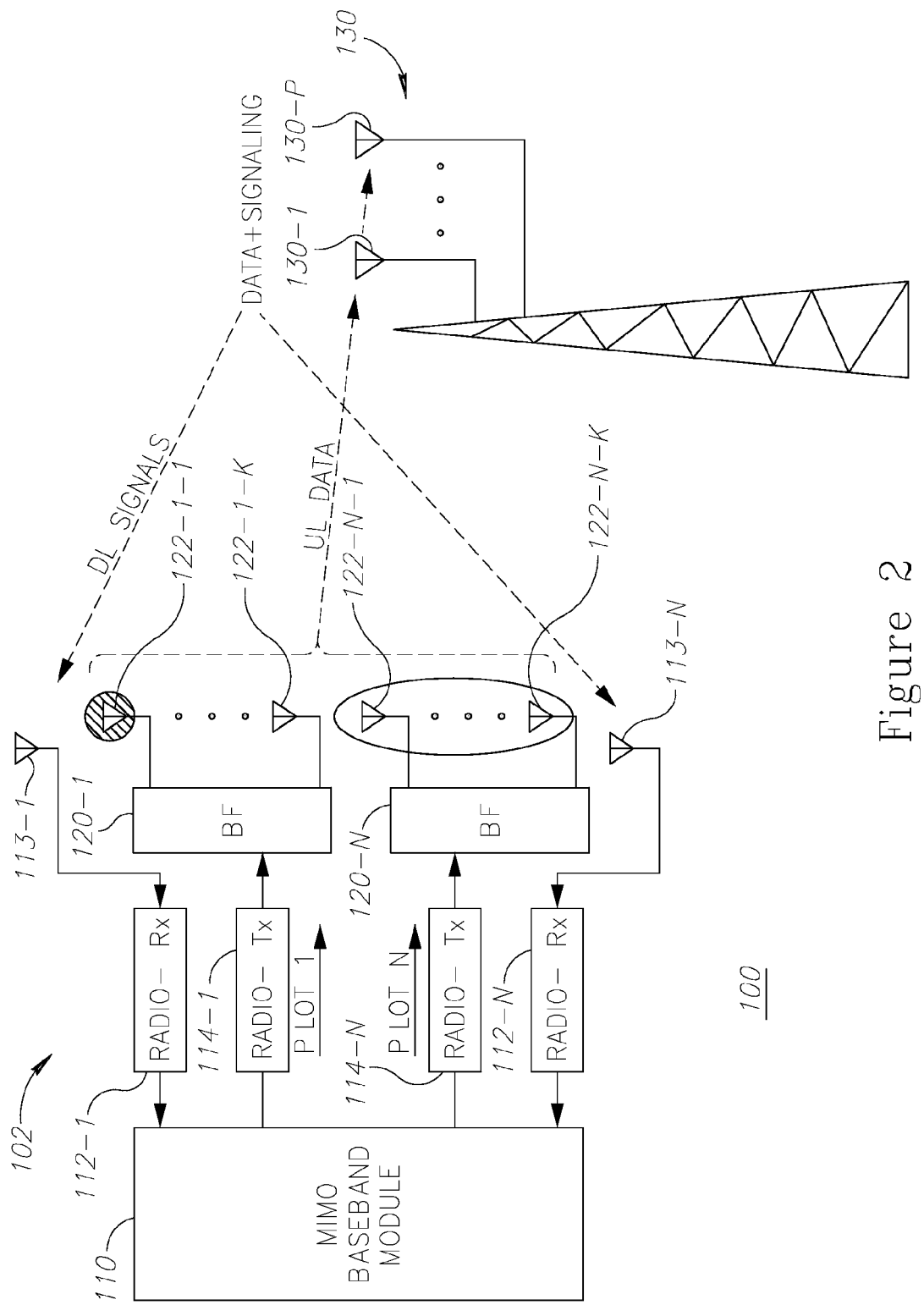
FIG. 2 is a high level block diagrams illustrating several aspects of a system according to embodiments of the present invention.

FIG. 2 is a high level block diagrams illustrating several aspects of a system according to embodiments of the present invention. A cellular communication system 100 includes a UE 102 having a MIMO RDN architecture and including a MIMO baseband module 110 connected to N receivers 112-1 to 112-N connected to respective receive antennas 113-1 to 113-N. MIMO baseband module 110 is further connected to transmitters 114-1 to 114-N. Each of transmitters 114-1 to 114-N is further connected to a respective beamformer 120-1 to 120-N which is in turn connected to K transmit antennas 122-1-1 to 122-1-K through 122-N-1 to 122-N-K totaling M antennas altogether so that in this example M=N*K.

A base station 130 is equipped with P antennas 130-1 to 130-P which communicate with both receive and transmit antennas 113-1 to 113-N and 122-1-1 to 122-1-K through 122-N-1 to 122-N-K. As noted above, there is a challenge, due to the MIMO RDN architecture, to carry out efficient MIMO transmit scheme that is based on pilot signals that were originally designed to support a smaller number of antennas.

According to some embodiments of the present invention, MIMO baseband module 110 may be configured to determine or calculate the weights of the transmitting antennas for each beamformer based on quality indicators derived from error rate measured at a receiving side associated with the transmit signals such as base station 130.

In accordance with some embodiments of the present invention, the aforementioned challenge may be addressed by implementing a "blind scanning" approach to each of transmit antennas 122-1-1 to 122-N-K separately. In accordance with the "blind scanning" approach, the scanning process is carried out in order to systematically test and adjust each and every one of the transmit antennas 122-1-1 to 122-N-K. This is achieved by transmitting the signals through one transmit antenna per beamformer at a time while all other M-K antennas in all other N-1 beamformers are operating with all of their assigned antennas as described below.

Another challenge due to the aforementioned "blind scanning" process is that the scanning sequence may take relatively long time to accomplish and the fading channel rate may change during a specified training sequence. It is therefore important to determine the circumstances in which it is advisable to use a subset L of the K antennas.

In accordance with some embodiments of the present invention, one or more beamformers 120-1 to 120-N may go or operate under an optimization process, in which antenna beam configurations of the beamformer are checked using a blind scanning process, in which the quality indicators are used to determine a desirable antenna configuration.

In accordance with some embodiments of the present invention, MIMO baseband module 110 may be configured to use Mobility Monitoring Indicators (MMI) to determine a subset L of K antennas in at least one of beamformers 120-1 to 120-N, for participating in beamforming, wherein the L antennas are selected using a grading mechanism.

In accordance with some embodiments of the present invention, the RDN (which accounts to all beamformers 120-1 to 120-N) is configured to apply an optimization process, using the quality indicators for at least some of the antenna configurations forming the beam, for at least some of beamformers 120-1 to 120-N, sequentially.

In accordance with some embodiments of the present invention, one or more beamformers 120-1 to 120-N may be configured to apply a blind scanning process for their tested antennas, in a sequential manner, and wherein the quality indicators are used to determine the desirable weights for the beamformer, wherein the beamformer is further configured to maintain the determined weights until a next optimization process for the beamformer.

In accordance with some embodiments of the present invention, MIMO baseband module 110 may be configured to repeatedly apply a "look through" process to all of the transmit antennas one at a time, so that a single transmit antenna in a specified beamformer is operative at a time, wherein antennas at other beamformers are further operative with all their antennas.

In accordance with some embodiments of the present invention, the aforementioned grading mechanism may include for example grading antennas using MCS; picking a best graded antenna as an anchor; pairing the anchor with each of the other antennas, one by one; registering MCS for two or more relative phases; and selecting the best paired antennas and the anchor, as the L antennas.

In accordance with some embodiments of the present invention, MIMO baseband module 110 may be further configured to apply a fine tuning process, to the selected L antennas.

Figure 3:
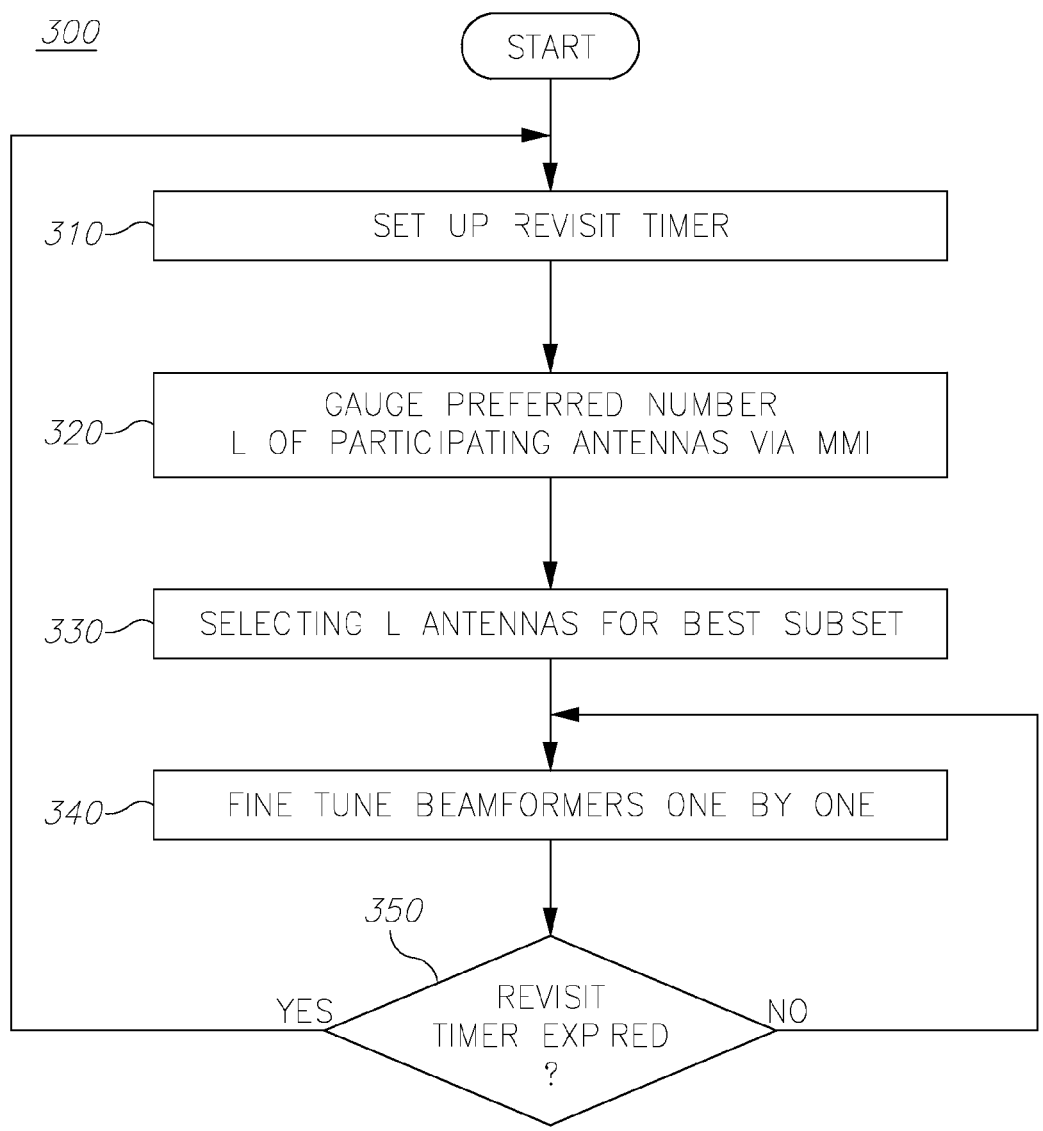
FIG. 3 is a high level flowchart illustrating aspects of the method according to some embodiments of the present invention.

FIG. 3 is a high level flowchart illustrating the training/testing algorithm 300 according to some embodiments of the present invention. The antenna testing algorithm 300 starts by setting up or configuring a revisit timer 310. Then, a preferred number of L antennas out of the participating antennas is determined or gauged via MMI 320. The testing sequence then goes on to the step of selecting the L specific antennas that constitutes the best subset 330. Then, in an iterative or repetitive process, the beamformers are being tuned one by one 340 until the revisit time has expired 350, after which the antenna testing sequence starts over with a new revisit time.

FIG. 4 is a flowchart 400 illustrating in further details aforementioned step 330 of the antenna selecting sub process. An initial operation includes picking beamformers one by one for antenna grading using "look through", while maintaining the other beamformers in a normal operation 410. Then, the picked beamformers antennas are graded one by one, using MCS measurements (e.g., via antenna's bypass switches) 420. Then the best graded antenna is selected as an anchor 430. The selected anchor is then paired with each of the other antennas one by one, each time measuring MCS in both zero and 180° phase difference 440. Then, each of the pairs are graded by using a best phase difference (by comparing pair's performance per the MCS) 450. Then, in an iterative step, the selection process repeats anchor selection, best paired antenna selection, the next best paired antenna etc., till L antennas are chosen 460.

Figure 5:
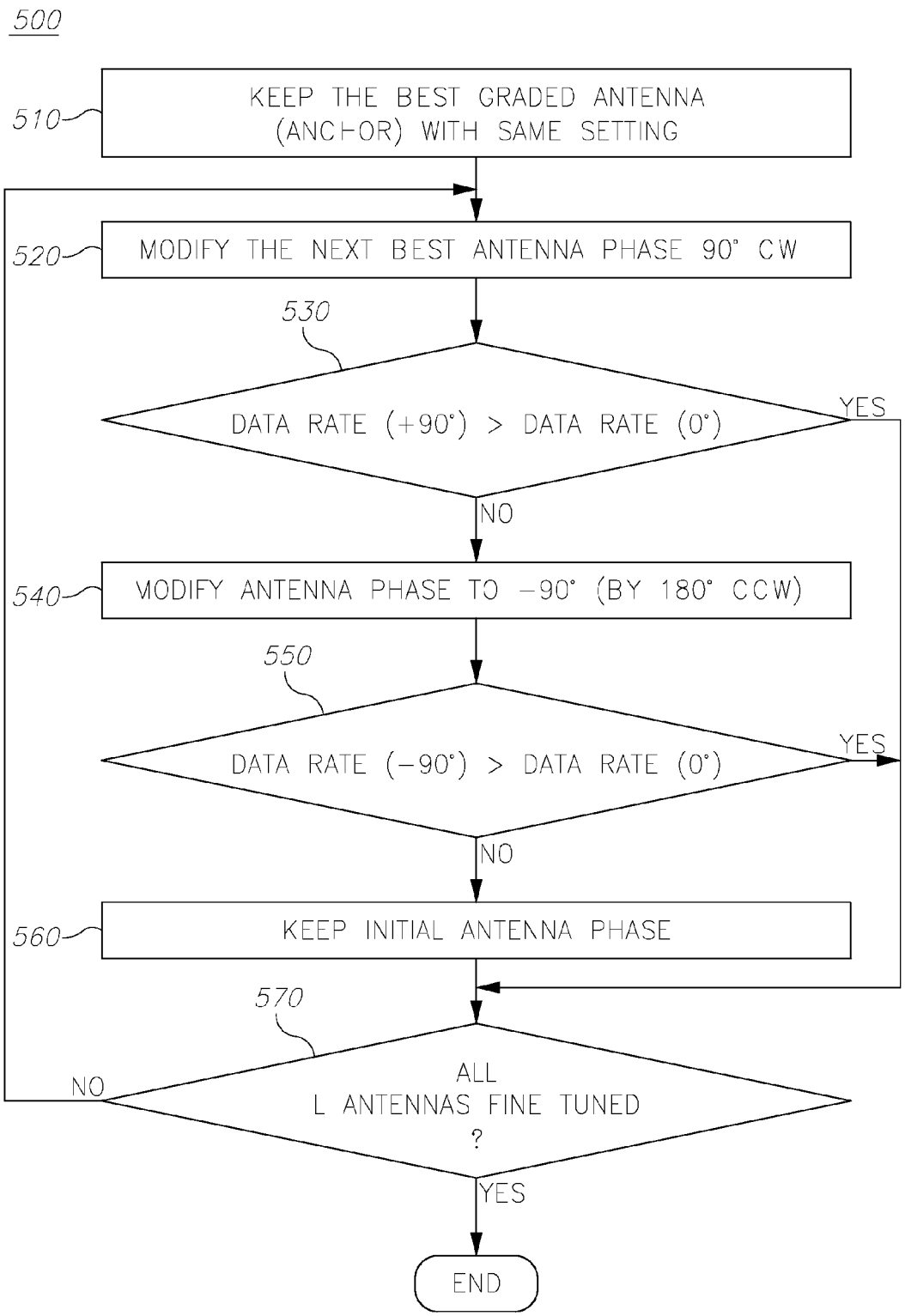
FIG. 5 is a more detailed flowchart illustrating another aspect according to some embodiments of the present invention.

FIG. 5 is a flowchart 500 illustrating in further details the aforementioned fine tuning sub process 340. The sub tuning starts by keeping the best graded antenna (anchor) with the same setting 510. The fine tuning then goes on to modifying the next best antenna phase at 90° clockwise 520. Then if the data rate of the +90° is not larger than the original data rate 530, the antenna phase is modified to −90° (being 180° counter clockwise). Then, if the data rate of −90° is not larger than the original data rate 550, the original antenna phase is kept 560. Then, in any case that the phase modification contributed to the increase of the data rate, the modified phase is selected and as long as all L antennas are not all fine tuned yet 570, the next best antenna's phase is modified by +90° and the aforementioned process is repeated till all L antennas are finely tuned.

Several example guidelines for determining the reduced number of transmit antennas to which the training sequence should be applied are provided below. The suggested quality indicator herein is mobility monitoring indicator (MMI).

For high Mobility situations i.e. Vehicular (e.g. V>10 km/h), only a small number of antennas (e.g. 2) will be selected as a fixed number; as a default, it will be the ones with best radiation patterns (i.e. subset is not selected per dynamic grade of performance, but per factory based antennas grading).

For Medium Mobility situations (e.g. 3 km/h<V<10 km/h), an optimizing number of participating antennas process is used; this process is a combination of MMI and trial and error method; the specific antennas to be participating in the subset is selected via best radiation pattern (and not per dynamic performance evaluation).

For Low Mobility situations (e.g. V<3 km/h), an optimizing number of participating antennas process is used; this process is a combination of MMI and trial and error method; the specific antennas to be participating in the subset is selected via antennas' path-loss estimation.

As will be appreciated by one skilled in the art, aspects of the present invention may be embodied as a system, method or an apparatus. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit", "module" or "system."

In various embodiments, computational modules may be implemented by e.g., processors (e.g., a general purpose computer processor or central processing unit executing software), or DSPs, or other circuitry. The baseband modem may be implanted, for example, as a DSP. A beamforming matrix can be calculated and implemented for example by software running on general purpose processor. Beamformers, gain controllers, switches, combiners, and phase shifters may be implemented, for example using RF circuitries.

The flowchart and block diagrams herein illustrate the architecture, functionality, and operation of possible implementations of systems and methods according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

In the above description, an embodiment is an example or implementation of the inventions. The various appearances of "one embodiment", "an embodiment" or "some embodiments" do not necessarily all refer to the same embodiments.

Although various features of the invention may be described in the context of a single embodiment, the features may also be provided separately or in any suitable combination. Conversely, although the invention may be described herein in the context of separate embodiments for clarity, the invention may also be implemented in a single embodiment.

Reference in the specification to "some embodiments", "an embodiment", "one embodiment" or "other embodiments" means that a particular feature, structure, or characteristic described in connection with the embodiments is included in at least some embodiments, but not necessarily all embodiments, of the inventions.

It is to be understood that the phraseology and terminology employed herein is not to be construed as limiting and are for descriptive purpose only.

The principles and uses of the teachings of the present invention may be better understood with reference to the accompanying description, figures and examples.

It is to be understood that the details set forth herein do not construe a limitation to an application of the invention.

Furthermore, it is to be understood that the invention can be carried out or practiced in various ways and that the invention can be implemented in embodiments other than the ones outlined in the description above.

It is to be understood that the terms "including", "comprising", "consisting" and grammatical variants thereof do not preclude the addition of one or more components, features, steps, or integers or groups thereof and that the terms are to be construed as specifying components, features, steps or integers.

If the specification or claims refer to "an additional" element, that does not preclude there being more than one of the additional element.

It is to be understood that where the claims or specification refer to "a" or "an" element, such reference is not be construed that there is only one of that element.

It is to be understood that where the specification states that a component, feature, structure, or characteristic "may", "might", "can" or "could" be included, that particular component, feature, structure, or characteristic is not required to be included.

Where applicable, although state diagrams, flow diagrams or both may be used to describe embodiments, the invention is not limited to those diagrams or to the corresponding descriptions. For example, flow need not move through each illustrated box or state, or in exactly the same order as illustrated and described.

The term "method" may refer to manners, means, techniques and procedures for accomplishing a given task including, but not limited to, those manners, means, techniques and procedures either known to, or readily developed from known manners, means, techniques and procedures by practitioners of the art to which the invention belongs.

The descriptions, examples, methods and materials presented in the claims and the specification are not to be construed as limiting but rather as illustrative only.

Meanings of technical and scientific terms used herein are to be commonly understood as by one of ordinary skill in the art to which the invention belongs, unless otherwise defined.

The present invention may be implemented in the testing or practice with methods and materials equivalent or similar to those described herein.

While the invention has been described with respect to a limited number of embodiments, these should not be construed as limitations on the scope of the invention, but rather as exemplifications of some of the preferred embodiments. Other possible variations, modifications, and applications are also within the scope of the invention. Accordingly, the scope of the invention should not be limited by what has thus far been described, but by the appended claims and their legal equivalents.

We claim:

1. A system comprising:
a multiple-input-multiple-output (MIMO) transmitting system comprising a MIMO baseband module having N branches, where N>1; and
a radio distribution network (RDN) connected to the MIMO transmitting system,
wherein the RDN comprises a plurality of beamformers, wherein each beamformer receives an input signal from a transmitting system and feeds K transmit antennas, where K>1, so that a total number of transmit antennas in the system is M=N*K, wherein each beamformer includes a passive splitter/combiner configured to split the received input signal into multiple transmit signals, said transmit signals being weighted individually for each transmit antenna,
wherein the MIMO baseband module is configured to determine the weights of the transmitting antennas for each beamformer based on quality indicators measured at a receiving side associated with the transmit signals, wherein the quality indicators comprise at least a Modulation Coding Scheme (MCS) determined by the receiving side; and
wherein the MIMO baseband module is configured to use Mobility Monitoring Indicators (MMI) to determine a subset L of the K transmit antennas in at least one of the beamformers, for participating in beamforming, wherein the subset L of the K transmit antennas is selected using a grading mechanism.

2. The system according to claim 1, wherein at least one of the beamformers operates under an optimization process, in which antenna beam configurations of the beamformer are checked using a blind scanning process, in which the quality indicators are used to determine a desirable antenna configuration.

3. The system according to claim 1, wherein the RDN is configured to apply an optimization process, using the quality indicators for at least some of the transmit antennas used in forming a transmit beam, for at least some of the beamformers, sequentially.

4. The system according to claim 1, wherein at least one of the beamformers is configured to apply a blind scanning process to tested antennas, in a sequential manner, and wherein the quality indicators are used to determine weights for the beamformer, wherein the beamformer is further configured to maintain the determined weights until a next optimization process for the beamformer.

5. The system according to claim 1, wherein the MIMO baseband module is configured to repeatedly apply a "look through" process to all of the transmit antennas one at a time, so that a single transmit antenna in a specified beamformer is operative at a time, wherein other beamformers are operative with all their respective antennas.

6. The system according to claim 1, wherein the grading mechanism comprises: (a) grading antennas using MCS; and (b) selecting a best graded antenna as an anchor; (c) pairing the anchor with each of the other antennas, one by one; and (d) selecting the best paired antennas and the anchor, as the subset L of the K transmit antennas.

7. The system according to claim, 6, wherein the MIMO baseband module is further configured to apply a fine tuning process, to the selected L antennas.

8. A system comprising:
a multiple-input-multiple-output (MIMO) transmitting system comprising a MIMO baseband module having N branches, where N>1; and
a radio distribution network (RDN) connected to the MIMO transmitting system,
wherein the RDN comprises a plurality of beamformers, wherein each beamformer receives an input signal from a transmitting system and feeds K transmit antennas, where K>1, so that a total number of transmit antennas in the system is M=N*K, wherein each beamformer includes a passive splitter/combiner configured to split the received input signal into multiple transmit signals, said transmit signals being weighted individually for each transmit antenna, wherein the MIMO baseband module is configured to determine the weights of the transmitting antennas for each beamformer based on quality indicators derived from error rate measured at a receiving side associated with the transmit signals, and wherein the MIMO baseband module is configured to use Mobility Monitoring Indicators (MMI) to determine a subset L of the K transmit antennas in at least one of the beamformers, for participating in beamforming, wherein the subset L of the K transmit antennas is selected using a grading mechanism.

* * * * *